July 16, 1957     J. R. PECK     2,799,175
POWER DRIVE TRANSMISSION AND PROPELLER
Filed Feb. 10, 1955     2 Sheets-Sheet 1
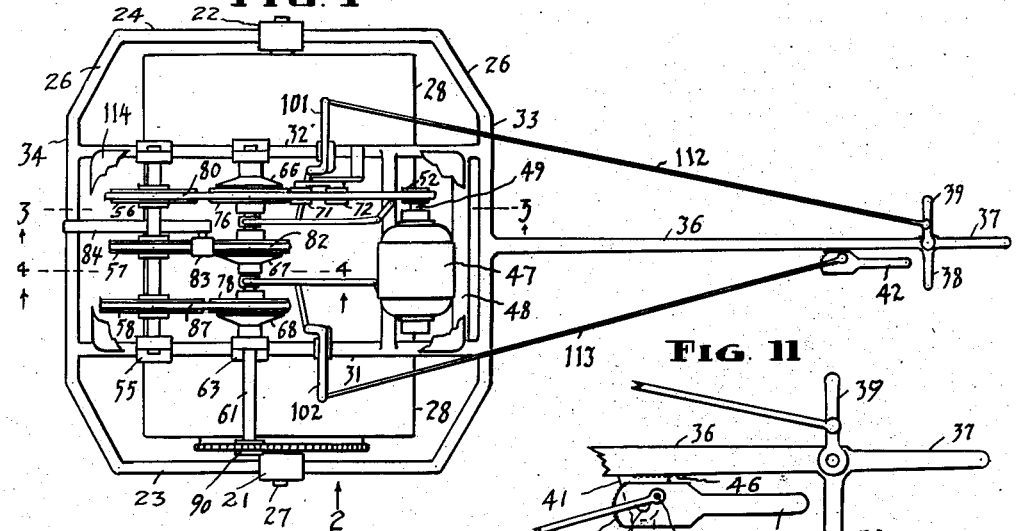
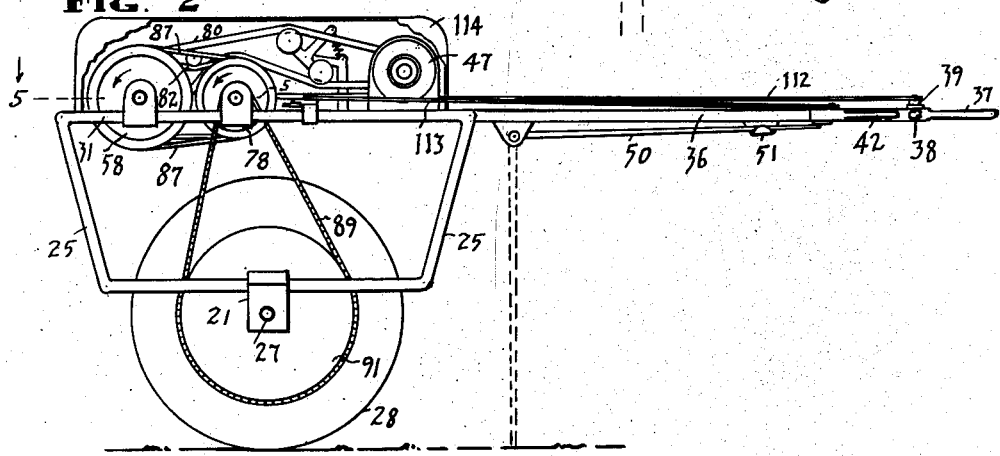
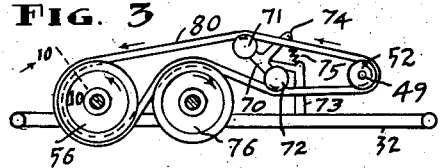
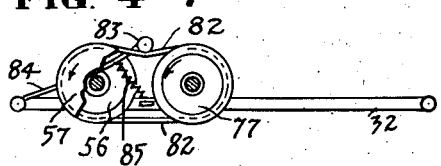
INVENTOR
JEAN R. PECK
ATTORNEY

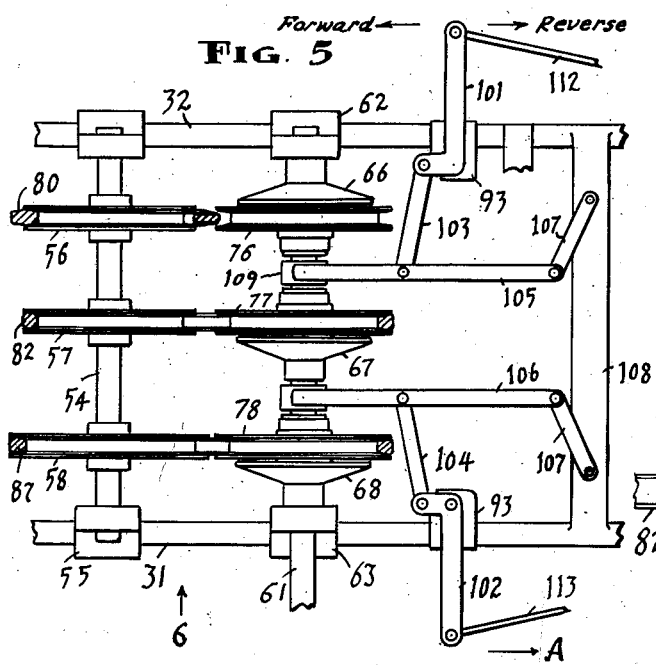
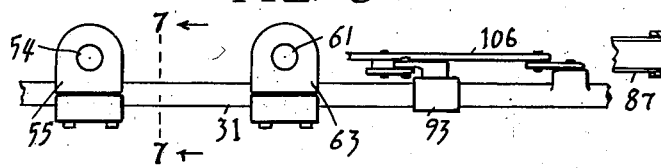
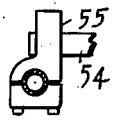
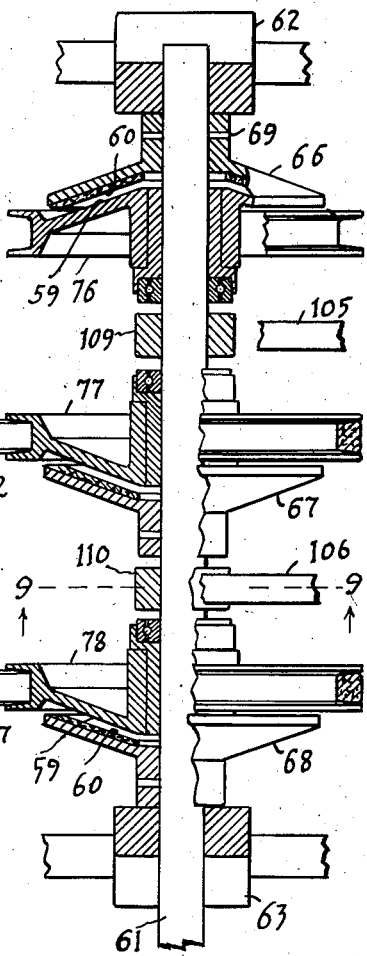
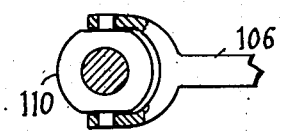

United States Patent Office 2,799,175
Patented July 16, 1957

2,799,175

POWER DRIVE TRANSMISSION AND PROPELLER

Jean R. Peck, Eaton, Ind.

Application February 10, 1955, Serial No. 487,334

2 Claims. (Cl. 74—218)

This invention relates to improvements in power transmission mechanisms.

The general idea upon which this invention has been developed is that of providing a low cost general purpose driving and power transmission mechanism suitable especially for portable machines such as agricultural and earth working implements.

My invention is shown herein as applied to an implement of the above named class which comprises a roller adapted to be drawn over the ground to smooth and compact it. My invention as exemplified herein provides my new power drive and transmission mechanism arranged with mounting therefor carried by said roller. It is so geared to the roller, and it is provided with such controls that the user may cause the roller to be thrown into, or thrown out of, operation; or may cause it to be driven forwardly at a fixed speed, or at an accelerated speed, or to be operated in reverse.

The general objects of my invention, as well as specific aims which have to do with features of structural improvement leading to creation of a product that is efficient, dependable and adaptable and at the same time is economical of manufacture, are accomplished by, and my invention is contained in the new construction, combination and arrangement of parts described in the following specification and defined in the claims.

The several parts of the invention, as they appear in the different views in the drawings are identified by suitable characters of reference applied to them.

In the drawings:

Fig. 1 is a top plan view of my new power drive and transmission mechanism as applied in connection with a ground roller implement.

Fig. 2 is an elevational view in the direction of arrow 2 in Fig. 1.

Fig. 3 is a vertical sectional view taken on broken line 3—3 in the direction of arrow 3 in Fig. 1.

Fig. 4 is a vertical sectional view at broken line 4—4 in the direction of arrow 4 in Fig. 1.

Fig. 5 is an enlarged horizontal sectional top plan view on broken line 5—5 in the direction of arrow 5 in Fig. 2.

Fig. 6 is an elevational view in the direction of arrow 6 in Fig. 5.

Fig. 7 is a cross section view on broken line 7—7 as seen in the direction of arrow 7 in Fig. 6.

Fig. 8 is an enlarged sectional plan view showing in detail the propeller shaft and parts immediately connected therewith.

Fig. 9 is a vertical cross section view on broken line 9—9 in the direction of arrow 9 in Fig. 8.

Fig. 10 is an enlarged cross section view on broken line 10—10 in Fig. 3.

Fig. 11 is a top plan view illustrative of the control bar and handle members for guiding the implement and for control of the drive and transmission mechanism.

In boxings 21 and 22 (see Fig. 1) which are secured to the lower portions 23 and 24 of opposed side members 25, 25 and 26, 26 of sub frame, are journaled the axial pintles 27 of a conventional ground roller 28 which, for example, is of dimensions of about twenty six inches in diameter and thirty six inches in length.

An open frame upon and by which the several parts of my invention are supported consists of side members 31, 32, and cross members 33 and 34, the ends of said cross members being secured to the upper ends of the side members 25, 25, 26 and 26 of said sub frame. The material preferred for the above named frame members is conventional iron pipe which is strong and durable and is relatively light in weight.

Extending forwardly from frame member 33 is central tongue 36 which embodies a handle 37 and a handle 38. Fulcrumed at the base of said handle 37 is a hand lever 39. Fulcrumed on a pin 40 of a lug 41 which projects from the forward portion of said tongue 36 is a hand lever 42 which has a stud 43 so located that when the said hand lever is in parallelism with said tongue, the stud 43 is in position between the plane of the vertical axis of pin 40 and the plane of the longitudinal axis of said tongue. Corrugations 44 on the arcuate heel of said lever are engaged with corrugations 46 which are provided on a side of the tongue 36, when said lever is moved to the broken line position, and wherein it is held against accidental change of position.

A power unit consists of an electric motor 47 mounted on cross members 48 and 108 of said frame. Its power shaft 49 has grooved pulley 52. On a drive shaft 54 which has its ends journaled in pillow blocks 55 that are secured to the frame members 31 and 32 are secured, in spaced order as indicated in the drawings, grooved drive pulleys 56, 57 and 58, which are denoted as first pulley, second pulley and third pulley respectively.

On propeller shaft 61 having its inner end journaled in pillow block 62, and its forward portion journaled in pillow block 63, which said shaft is spaced a predetermined distance from and is in parallelism with the drive shaft 54 are arranged, in alignment with said first pulley 56, second pulley 57 and third pulley 58, a first clutch, a second clutch and a third clutch. Each of these clutches is of a cone friction type and consists of a driving part and a driven part, the driving part having machined facing 59 and the driven part having an applied composition friction lining 60. Driving parts 76, 77 and 78 circumferentially grooved as shown in the drawings are journaled on and are movable longitudinally of said propeller shaft 61, as shown in detail in Fig. 8. The driven parts 66, 67 and 68 of said clutches are secured as by diametral pins 69 to said propeller shaft 61. The drive shaft 54 is so spaced from said propeller shaft that the peripheries of said drive pulleys and the peripheries of said driving parts of said clutches are in close relation and in alinement.

Endless double-V belting (see Fig. 10) 80 trained over power pulley 52 of the motor, first pulley 56, thence upwardly (see Fig. 3) on driving part 76 of said first clutch is maintained at suitable tension as by tightener consisting of beam 70 with rollers 71 and 72 at its ends, pivoted at its center on upright 73 and having its arm 74 urged downwardly by a spring 75 thereby urging the rollers against the confronting surfaces of said belting 80.

Endless V belt 82 (see Fig. 4) trained over second drive pulley 57 and driving part 77 of second clutch is maintained tightened by a roller 83 that is journaled on pin of arm 84 which is urged downwardly by a spring 85.

Endless V belt 87 (see Fig. 2) is trained over third drive pulley 58 and the driving part 78 of the third clutch.

A sprocket chain 89 trained over sprocket 90 which is secured to the extended portion of propeller shaft 61, and which said chain is trained over sprocket 91 that is secured to an end of the said ground roller 28 constitutes power transmitting connection for said roller.

Fulcrumed on pillow blocks 93 that are secured to the frame members 31 and 32 are levers 101 and 102, their weight arms being pivotally connected, as by links 103 and 104 to shift bars 105 and 106 hingedly connected at their rear ends, by links 107 to cross member 108 of the frame. The forward forked end of bar 105 is connected loosely to thrust ring 109 that is journaled on and is slidable longitudinally of propeller shaft 61, at location between driving part 76 of first clutch and driving part 77 of the second clutch. The forked end of shift bar 106 is connected loosely to a thrust ring 110 that is loose longitudinally on the propeller shaft 61 at location between the driven part 67 of second clutch and the driving part 78 of the third clutch.

Interconnecting the hand lever 39 (see Fig. 11) of the frame tongue 36 with the said lever 101 is reach rod 112; and interconnecting the hand lever 42 of the said frame tongue with the said lever 102 is the reach rod 113.

The user, by applying a hand to handle 37, or to the handle 38 of said tongue, is enabled to readily bear the tongue to right or to left in the procedure of causing the roller to move in the course desired. At the same time, one or the other by his hands may be applied as may be desired, to either the hand lever 39, or to the hand lever 42, and by which said hand levers the levers 101 and 102 are moved. Sheet metal cover case 114 mounted on the frame forms a protective shield against the elements, and a guard to afford safety against liability of personal injury.

In readiness to be operated the implement appears as in Fig. 1 and Fig. 2, a prop 50 having been unhooked at clip 51 and disposed at upright position. Levers 101 and 102 are in neutral positions, as are the thrust rings 109 and 110.

Upon closing the switch (not shown) the motor is in motion. Direction of rotation of motor power shaft 49 is anti-clockwise, as is also the direction of motion of the drive pulleys 56, 57, and 58. The direction of rotation of the driving part 76 (see Fig. 3) is clockwise. Said driving part 76 is idling. Also the driving parts 77 and 78 are idling. Propeller shaft 61, as are the driven parts 66, 67 and 68, is static.

Upon lifting the prop leg to place and hooking same to tongue as at clip 51, the user, now holding at the handle 37 or handle 38 may maneuver the implement as desired.

To cause the propeller shaft 61 to move counter-clockwise (the roller to go forward) lever 101 (see Fig. 1 and Fig. 5) is moved in direction of arrow R thereby throwing driven part 77 of second clutch to contact with driven part 67 of said second clutch, causing propeller shaft 61 to rotate counter-clockwise (driving parts 76 and 78 are idling).

To accelerate said forward movement of the roller, return lever 101 to neutral, then move lever 102 in the direction of arrow A thereby throwing driving part 78 of third clutch to contact with driven part 68 of said third clutch, causing shaft 61 to move at increased speed (being then driven by drive pulley 58, and the driving parts 76 and 77 now idling). To return from said increased speed, to the first or normal speed, return lever 102 to neutral, and then move lever 101 in the direction of arrow R thereby throwing driving part 77 of second clutch to contact with driven part 67 of second clutch, causing shaft 61 to rotate at normal speed.

To cause the roller to move in a rearward direction, the lever 101 is moved in the direction of the arrow indicated Reverse, thereby throwing the driving part 76 of the first clutch into contact with driven part 66 of the first clutch (belt 80 from pulley 56 driving the driving part 76) and driven part 66 moving shaft 61 clockwise. Driven parts 77 and 78 are now idling. To cause the roller to move in a forward direction the lever 101 is moved in the direction of the arrow indicated Forward, thereby throwing the driven part 77 of the second clutch into contact with driven part 67 of the second clutch (belt 82 from pulley 57 driving the driving part 77) and driven part 67 moving shaft 61 anti-clockwise.

My new transmission and change speed mechanism while being relatively light in weight, is sturdy and dependable, and it lends itself to being adapted in size, form and capacity to meet requirements of the machinery and of vehicular equipment to which the invention is to be applied, and its operation is accompanied by a minimum of noise, in fact being practically silent. All of the parts composing the invention being of design making them capable of being processed by conventional machinery and tools, and by ordinarily skilled mechanics, the invention especially lends itself to utmost facility and economy in manufacture. At the same time the device is durable, dependable and not likely to get out of order or repair.

While my invention as it is exemplified herein, is illustrated and described with particularity and its structural features are carefully detailed, it will be understood that modifications may be made without departing from the spirit and principle of my invention or sacrificing any of its advantages.

What I claim as my invention is:

1. A power transmission mechanism comprising a frame, a motor carried by said frame, a power shaft projecting from said motor, a pulley carried by said shaft, a drive shaft positioned on one side of and in parallel spaced relation with respect to said power shaft and carried by said frame, first second and third pulleys arranged in spaced relation along and carried by said drive shaft, a propeller shaft positioned between and in parallel spaced relation with respect to said power and drive shafts, a first clutch including a driving part and a driven part positioned complemental to said first pulley and having the driving part rotatably mounted on said propeller shaft and having the driven part fixedly connected to said propeller shaft, a belt trained over said power shaft pulley, said first pulley and the driving part of said first clutch, a second clutch including a driving part and a driven part positioned complemental to said second pulley and having the driving part adjacent the driving part of said first clutch and rotatably mounted on said propeller shaft and having the driven part remote from the driven part of said first clutch and fixedly connected to said propeller shaft, a belt trained over said second pulley and the driving part of said second clutch, a third clutch including a driving part and a driven part positioned complemental to said third pulley and having the driving part adjacent the driven part of said second clutch and rotatably mounted on said propeller shaft and having the driven part remote from the driven part of said second clutch and fixedly connected to said propeller shaft, a belt trained over said third pulley and the driving part of said third clutch, a ring loosely supported on the portion of said propeller shaft between the driving part of said first clutch and the driving part of said second clutch, operator operable means operatively connected to said ring to selectively shift said ring into engagement with either of the driving parts of said first and second clutches and cause engagement of the driving part with the driven part of the adjacent clutch, a ring loosely supported on the portion of said propeller shaft between the driven part of said second clutch and the driving part of said third clutch, and operator operable means operatively connected to said last-named ring to selectively shift said last-named ring into engagement with the driving part of said third clutch and cause engagement of the driving part of said third clutch with the driven part of said third clutch.

2. A power transmission mechanism comprising a frame, a rotatable roller supporting said frame, a motor carried by said frame, a power shaft projecting from said motor, a pulley carried by said shaft, a drive shaft positioned on one side of and in parallel spaced relation with respect to said power shaft and carried by said frame, first second and third pulleys arranged in spaced relation along and carried by said drive shaft, a propeller shaft positioned between and in parallel spaced relation with respect to said power and drive shafts, a first clutch including a driving part and a driven part positioned complemental to said first pulley and having the driving part rotatably mounted on said propeller shaft and having the driven part fixedly connected to said propeller shaft, a belt trained over said power shaft pulley said first pulley and the driving part of said first clutch, a second clutch including a driving part and a driven part positioned complemental to said second pulley and having the driving part adjacent the driving part of said first clutch and rotatably mounted on said propeller shaft and having the driven part remote from the driven part of said first clutch and fixedly connected to said propeller shaft, a belt trained over said second pulley and the driving part of said second clutch, a third clutch including a driving part and a driven part positioned complemental to said third pulley and having the driving part adjacent the driven part of said second clutch and rotatably mounted on said propeller shaft and having the driven part remote from the driven part of said second clutch and fixedly connected to said propeller shaft, a belt trained over said third pulley and the driving part of said third clutch, a ring loosely supported on the portion of said propeller shaft between the driving part of said first clutch and the driving part of said second clutch, operator operable means operatively connected to said ring to selectively shift said ring into engagement with either of the driving parts of said first and second clutches and cause engagement of the driving part with the driven part of the adjacent clutch, a ring loosely supported on the portion of said propeller shaft between the driven part of said second clutch and the driving part of said third clutch, operator operable means operatively connected to said last-named ring to selectively shift said last-named ring into engagement with the driving part of said third clutch and cause engagement of the driving part of said third clutch with the driven part of said third clutch, and means drivingly connecting said roller to said propeller shaft.

References Cited in the file of this patent
UNITED STATES PATENTS

| | | |
|---|---|---|
| 881,545 | Caps | Mar. 10, 1908 |
| 2,292,952 | MacDonald | Aug. 11, 1942 |
| 2,429,378 | Stuebner | Oct. 21, 1947 |